June 4, 1940.　　　　　S. R. CONWELL　　　　　2,203,489
BUMPER GUARD
Filed June 29, 1939　　　　2 Sheets-Sheet 2
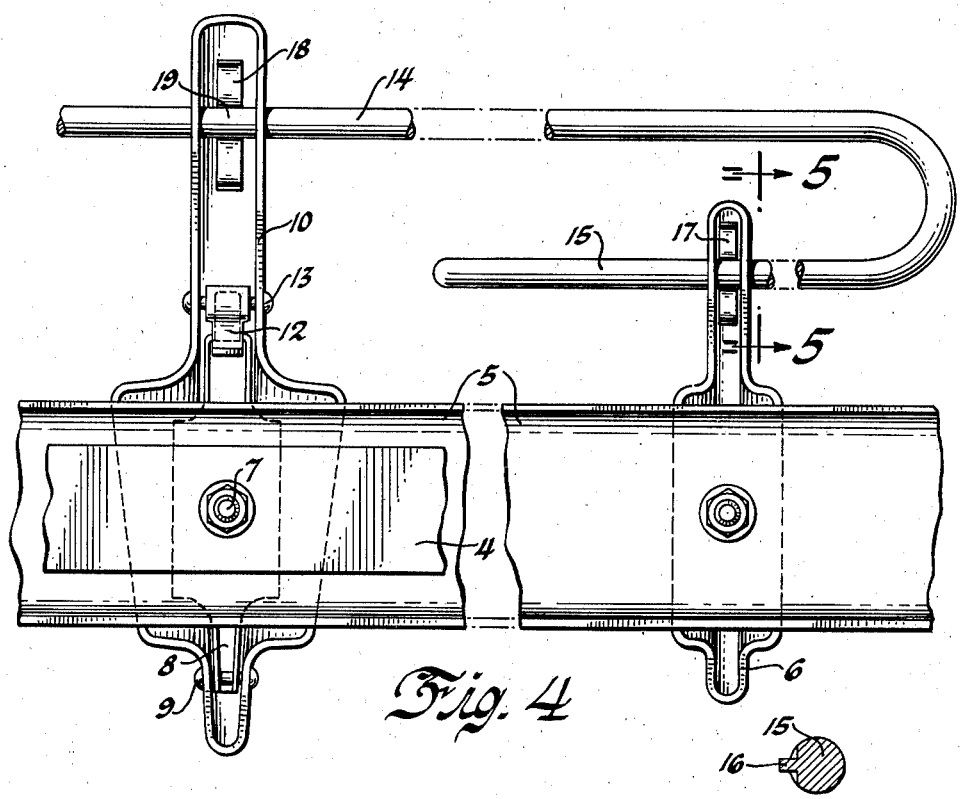
Fig. 4
Fig. 5
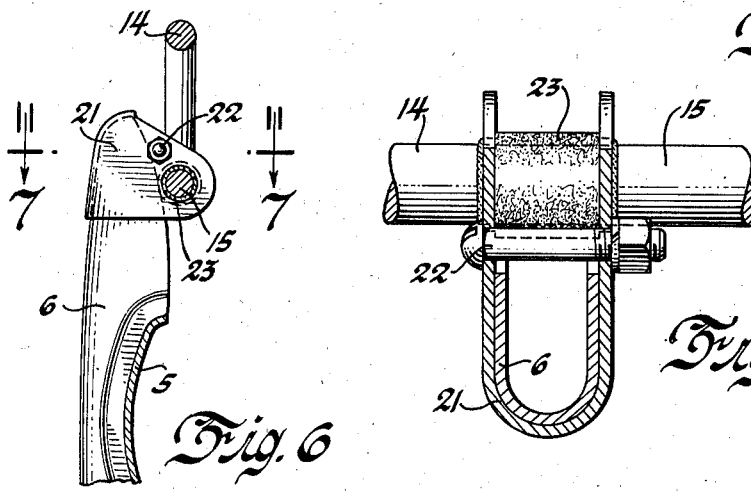
Fig. 6　　　Fig. 7
Inventor
Scott R. Conwell
By
Attorneys Patented June 4, 1940

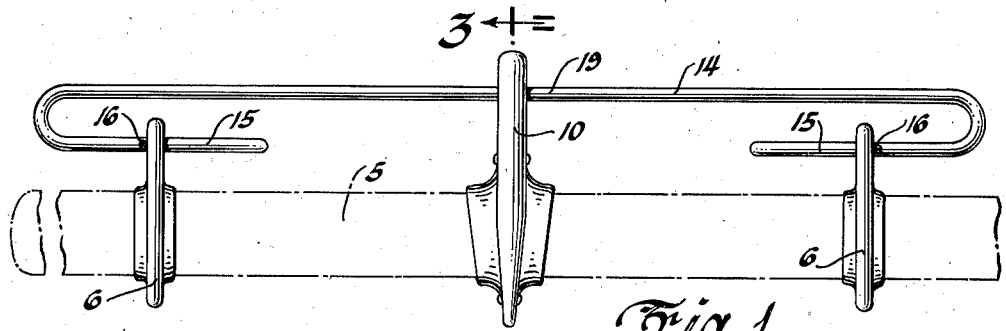
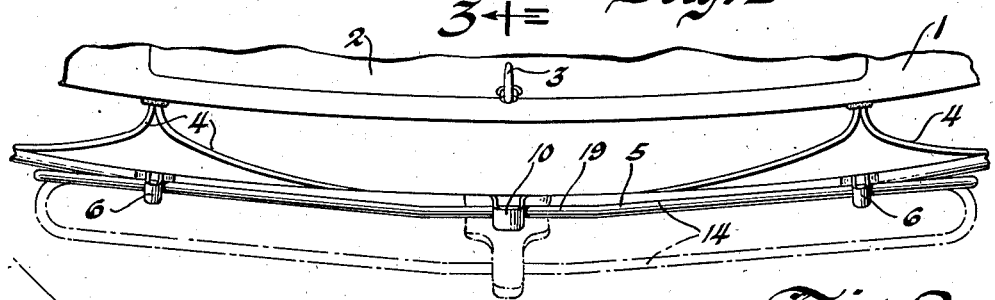
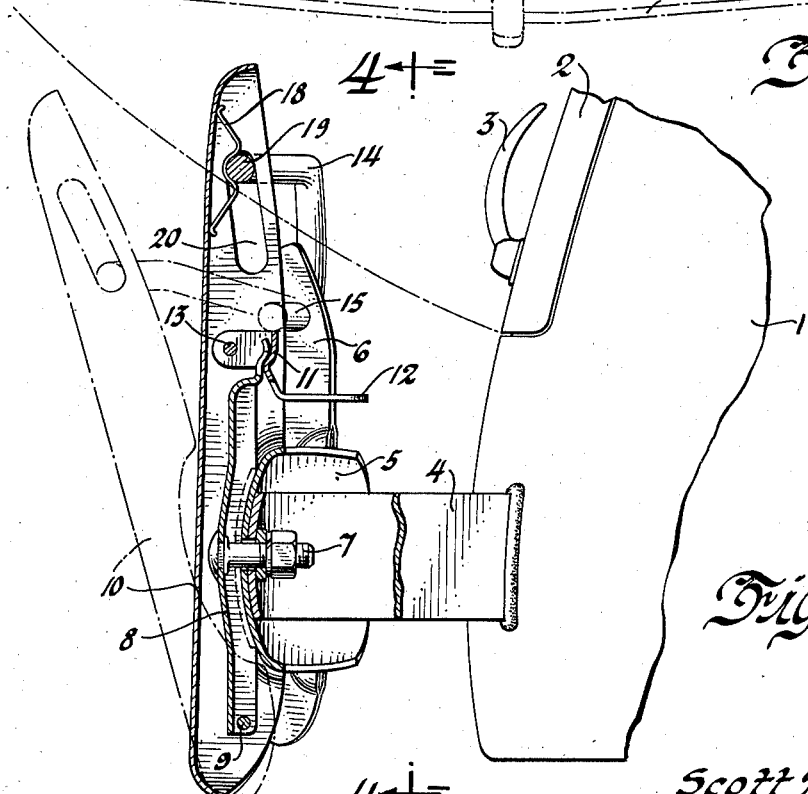

2,203,489

UNITED STATES PATENT OFFICE 2,203,489

BUMPER GUARD

Scott R. Conwell, Anderson, Ind., assignor to General Motors Corporation, Detroit, Mich., a corporation of Delaware Application June 29, 1939, Serial No. 281,912

12 Claims. (Cl. 293—55)

This invention relates to motor vehicle bumpers and more particularly to an auxiliary protection guard assembly intended primarily for application to conventional bumper structure as an accessory device.

Since the advent of the now popular single bar bumper on motor cars it has been the practice to increase the range of protection by the addition of vertical guards usually arranged in pairs and spaced apart. The permissible height of the guards is determined by the path of swinging movement of the hinged door for the rear luggage compartment. When a vertical guard is of a size to project into the path of the luggage door it is mounted on the main bumper bar so as to be displaceable from its normal position for access to the trunk. A hinged guard is generally considered an accessory item to supplement the regular bumper guards installed by the motor car manufacturer as standard equipment. When the bumpers on two cars come together the vertical guards on one bumper in some instances override and interlock with the other bumper.

It is an object of the present invention to provide a bumper assembly wherein a secondary bar is superposed above the main impact bar to increase materially the range of protection afforded and more particularly to block overriding and interlocking of the bumpers, but which is displaceable with the supplemental guard post from the path of the luggage door.

A further object of the invention is to provide a secondary bar and hinged guard post unit which may be readily applied as an accessory item to existing bumper equipment and which when so applied will enhance general appearance and be free from rattles.

Additional objects and advantages will become apparent during the course of the following specification having reference to the accompanying drawings wherein Figures 1 and 2 are, respectively, elevational and plan views of the improved bumper assembly; Figure 3 is an enlarged sectional view taken on line 3—3 of Figure 1; Figure 4 is an enlarged and fragmentary elevation of the bumper assembly as viewed from the rear and in the direction of the arrows on line 4—4 of Figure 3; Figure 5 is a detail section on line 5—5 of Figure 4; Figure 6 is a view partly in section and illustrates an optional mounting of the secondary bar and Figure 7 is a sectional view taken on line 7—7 of Figure 6.

The rear end of an automobile body is indicated by the numeral 1 as having an upwardly and outwardly swinging door 2 for the rear luggage compartment, with an operating handle 3 by which the door may be swung about a hinged axis at the top through a path which is indicated generally by the broken lines in Figure 3. Projecting through the rear wall of the body 1 are the usual supporting members 4 for the main impact member 5 at the rear of the vehicle. Toward opposite ends of the bumper assembly are bolted or otherwise fixedly secured to the bar 5 a pair of vertical guards 6—6, illustrated in the drawing as consisting of stampings projecting above and below the upper and lower edges of the impact member 5 but being outside the path of swinging movement of the door 2 as seen in Figure 3.

Secured centrally of the impact bar 5 by the attachment stud 7 is a mounting plate 8, having at its lower end a pivot pin 9 carried by the lower portion of a vertical post 10 which is generally of channel shape in section. At its upper end the fixed mounting bracket 8 is provided with an ear 11 engageable by a latch 12 pivoted on a pin 13 carried by the post 10. With parts positioned as shown in Figure 3 the vertical post affords a guard to increase the range of a vertical protection but its upper end lies within the path of door movement. To adjust the guard for access to the luggage compartment the latch 12 is swung about its pivot 13 which frees the vertical post for outward displacement about the pivot axis 9 to the broken line position shown in Figure 3. This adjustment of the guard carries with it and also out of the path of door movement the secondary bar 14 extending above and in spaced parallelism with the impact member 5 with its opposite ends offset and pivotally supported in the end guards 6—6. The offset end portions are illustrated in the drawings as comprising reversely bent and inwardly extending portions 15 projecting through aligned openings in the side flanges of the channel sectioned guards 6.

For proper positioning of the parts each offset end portion 15 has an abutment or locating shoulder 16 formed thereon, which for convenience and economy of manufacture may consist of a deformed ear squeezed from the bar as shown in the detail view, Figure 5, and which abutment engages the side face of an adjacent guard 6. To prevent rattles a bowed leaf spring 17 may be positioned within the channel of the guard for engagement with the end portion 15 projecting therethrough.

A similar leaf spring 18, as best seen in Figure 3, may be interposed between the center guard 10 and the forwardly bowed central portion 19 of the secondary bar 14. This central portion 19 extends through a pair of aligned elongated slots 20 in the side flanges of the post 10 for sliding movement therein together with the spring 18, when the parts are moved between their normal upright position and their outwardly displaced position. The connection between the central post 10 and the secondary bar 14 serves to maintain the bar 14 in upright position on its pivotal supports as a barrier against overriding and the sliding pin and slot arrangement accommodates the relative arcuate paths of the two members about their respective pivotal mountings.

To eliminate the need for punching or otherwise forming openings in the guards 6 to receive the offset ends 15 when the hinged post and supplemental bar are to be applied as an accessory item, the adapter device shown in Figures 6 and 7 may be used. This consists essentially of a split contractible socket 21 to be fitted on the upper end of the end guard 6 and secured by a clamping stud 22. The projecting ends of the socket 21 are provided with aligned openings to receive the opposite ends of a rubber bushing 23 sleeved on the end 15 of the secondary bar. The rubber bushing 23 allows adjustment of the secondary bar and cushions the parts against rattle.

I claim:

1. In an automobile having an outwardly opening door, a bumper structure including a main impact bar, a vertical guard having its upper end normally positioned in the path of movement of said door, means mounting said guard on the main impact bar for displacement out of the path of door movement, a secondary impact bar also positioned normally in the path of door movement, means mounting the same on the main impact bar for displacement from said path and a connection between the secondary bar and said vertical guard for their action in unison.

2. For use with a main impact bar carrying a pair of spaced bumper guards, an auxiliary comprising a secondary impact bar having its opposite ends arranged for pivotal connection with said bumper guards and a centrally disposed guard post having a connection at its upper end with an intermediate portion of said secondary impact bar and means for displaceably mounting said central guard post on the main impact bar.

3. For use with a main impact bar carrying a pair of spaced bumper guards, an auxiliary comprising a secondary impact bar of substantially C-shape having its opposite reversely bent ends pivotally mounted on said guards, a center guard post having a pivotal connection with an intermediate portion of the C-shaped bar and means for pivotally mounting said post on the main impact bar.

4. In combination with a main impact bar, of a secondary bar having its ends offset vertically from the central portion thereof, means pivotally connecting said ends on the main impact bar, a vertical post displaceably mounted on the main impact bar for outward movement with respect thereto and a sliding connection between said post and the central portion of said secondary bar.

5. In combination with a main impact bar, of a vertical guard post pivotally mounted on the main impact bar for outward swinging movement, a secondary impact bar pivotally supported by the main impact bar on an axis in spaced parallelism with the pivotal mounting axis of said post and a slidable interconnection between said post and the secondary bar for their unisonal swinging movement about the spaced pivotal axes thereof.

6. For use with a bumper having a pair of spaced end guards, a supplemental protective assembly including a displaceable vertical guard post for mounting centrally of the bumper, a secondary impact bar having its central portion projecting through an elongated slot in the upper portion of said post and having its ends reversely bent for projection through and pivotal support in openings in the respective end guards of the bumper.

7. For use with a bumper having a pair of spaced end guards, a supplemental protective assembly including a secondary bar to be superposed above the bumper and provided with offset ends to project through openings in said end guards for the pivotal mounting thereof, anti-rattle springs associated with said pivotal mountings, a central guard post of channel section having aligned slots in its side flanges slidably receiving the central portion of said secondary bar, an anti-rattle spring interposed between said post and the bar portion projecting therethrough, and means for pivotally supporting said post on the bumper.

8. For use with a bumper having a pair of spaced end guards, a supplemental protective assembly including a secondary bar to be superposed above the bumper and provided with offset ends to project through openings in said end guards for the pivotal mounting thereof, locating abutments formed on said offset bar ends to engage the side faces of the guards and a central post having a connection at its upper end with the central portion of said bar and being arranged for pivotal connection at its lower end with the bumper.

9. For use with a bumper having a pair of spaced end guards, a supplemental protective assembly including a displaceable vertical guard post for mounting centrally of the bumper a secondary impact bar connected with said post and provided with offset end portions and an adapter device pivotally connected to each offset end portion for attachment to said end guards.

10. In combination with a bumper having a pair of end guards, of a secondary bar spaced vertically above the bumper, an adapter fitted to each end guard and hingedly mounting the ends of said secondary bar, and a central guard post mounted on the bumper for outward displacement and connected with the secondary bar for moving the same therewith.

11. For use with a bumper having a pair of fixed end guards and a central hinged guard, a secondary bar superposed above the bumper and connected with the hinged guard for movement therewith and means pivotally supporting the ends of said secondary bar on the end guards and including attachment brackets having hinged connection with said bar ends and means for clamping said brackets on the upper ends of said end guards.

12. For use with a bumper having a pair of fixed end guards and a central hinged guard, a secondary bar superposed above the bumper and connected with the hinged guard for movement therewith, a mounting bracket at each end of said bar comprising a split socket to receive the top of an adjacent end guard, means to contract said socket into tight gripping engagement with the guard, and a rubber bushing carried by said socket and receiving the bar end therein.

SCOTT R. CONWELL.